US012737742B2

(12) United States Patent
Zeng et al.

(10) Patent No.: US 12,737,742 B2
(45) Date of Patent: Sep. 15, 2026

(54) METHOD FOR CONTROLLING INTELLIGENT POINT OF SALE, AND TERMINAL DEVICE

(71) Applicant: SHENZHEN ZOLON TECHNOLOGY CO., LTD., Shenzhen (CN)

(72) Inventors: Lingcong Zeng, Shenzhen (CN); Huan Wang, Shenzhen (CN); Youren Chen, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 134 days.

(21) Appl. No.: 18/845,349

(22) PCT Filed: Mar. 21, 2023

(86) PCT No.: PCT/CN2023/082842

§ 371 (c)(1),
(2) Date: Sep. 9, 2024

(87) PCT Pub. No.: WO2023/185557

PCT Pub. Date: Oct. 5, 2023

(65) Prior Publication Data

US 2025/0190964 A1 Jun. 12, 2025

(30) Foreign Application Priority Data

Mar. 28, 2022 (CN) ......................... 202210313428.6

(51) Int. Cl.
*G06Q 20/20* (2012.01)
*H04W 76/10* (2018.01)
*H04W 76/40* (2018.01)

(52) U.S. Cl.
CPC .......... *G06Q 20/202* (2013.01); *H04W 76/10* (2018.02); *H04W 76/40* (2018.02)

(58) Field of Classification Search
CPC ....... H04W 76/40; H04W 4/80; H04W 76/14; H04W 76/19; H04B 17/318
See application file for complete search history.

(56) References Cited

U.S. PATENT DOCUMENTS 11,140,738 B1 * 10/2021 Rane .................... H04B 17/382
11,871,237 B1 * 1/2024 Han ..................... G06Q 20/202
(Continued)

FOREIGN PATENT DOCUMENTS

CN 109300236 2/2019
CN 109859386 6/2019

*Primary Examiner* — Florian M Zeender
*Assistant Examiner* — Vanessa Deligi
(74) *Attorney, Agent, or Firm* — ScienBiziP, P.C.

(57) ABSTRACT

The present application provides a method for controlling an intelligent point of sale, and a terminal device. The method includes determining information of the intelligent point of sale from broadcast information in response to the broadcast information being received, which is sent by the intelligent point of sale; determining a list of target terminals according to all received broadcast information; establishing a communication connection relationship with a target intelligent point of sale in response to a received communication connection instruction; and establishing a communication connection relationship between a first intelligent point of sale and a second intelligent point of sale in response to a received intercommunication connection instruction.

11 Claims, 3 Drawing Sheets

(56) References Cited

U.S. PATENT DOCUMENTS

| | | | | |
|---|---|---|---|---|
| 2016/0165056 | A1* | 6/2016 | Bargetzi | H04L 63/105 455/416 |
| 2016/0198314 | A1* | 7/2016 | Jung | H04W 4/20 370/312 |
| 2016/0295353 | A1* | 10/2016 | Sugimoto | H04W 76/15 |
| 2019/0004785 | A1* | 1/2019 | Kelley | G06F 8/71 |
| 2021/0345085 | A1* | 11/2021 | Anselm | H04W 8/005 |
| 2022/0104102 | A1* | 3/2022 | Amar | H04W 4/06 |
| 2022/0225104 | A1* | 7/2022 | Liu | G06F 3/0482 |

* cited by examiner

METHOD FOR CONTROLLING INTELLIGENT POINT OF SALE, AND TERMINAL DEVICE

The present application claims the priority to Chinese patent application with application No. 202210313428.6, filed on Mar. 28, 2022, the content of the present application is incorporated herein by reference.

FIELD

The present application relates to a field of equipment management technology, and specifically to a method for controlling an intelligent point of sale, and a terminal device.

BACKGROUND

With development of electronic payment technology, an intelligent point of sale (POS), as a multifunctional terminal device, has been widely used in multiple technical fields and scenarios.

During use of the intelligent point of sale, how to detect the device quickly and manage the device is an important key.

The equipment management method for managing related intelligent point of sale is usually that the user manually establishes a connection relationship between a user equipment and the intelligent point of sale and manages the intelligent point of sale. The equipment management method is single, has lower efficiency and is poor flexibility.

BRIEF DESCRIPTION OF THE DRAWINGS

In order to more clearly illustrate technical solutions in the embodiments of the present application, the drawings required for use in the embodiments, or the description of prior art will be briefly introduced below. Obviously, drawings described below are only some embodiments of the present application. For ordinary technicians in this field, other drawings can be obtained based on the drawings without paying any creative labor.

DESCRIPTION

Figure 1:
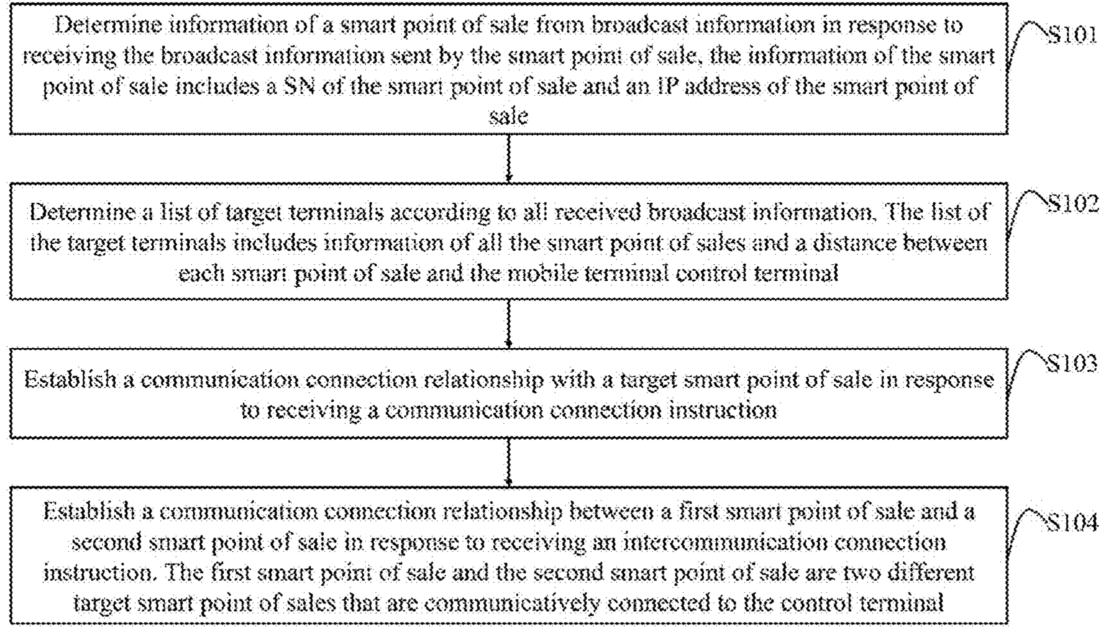
FIG. 1 is a schematic diagram of a flowchart of a method for controlling an intelligent point of sale provided by a first embodiment of the present application.

In following description, for a purpose of explanation rather than limitation, specific detail such as specific system structure and technology are provided to provide a thorough understanding of an embodiment of present application. However, it will be apparent to those skilled in art that the present application may be practiced in other embodiments without the specific detail. In other instances, detailed description of well-known system, device, circuit, and method are omitted so as not to obscure the description of the present application with unnecessary detail.

It should be understood that when used in this specification and the appended claims, the term "comprising" indicates presence of described features, integers, steps, operations, elements and/or components, but does not exclude the presence or addition of one or more other features, integers, steps, operations, elements, elements and/or components thereof.

It will also be understood that a term "and/or" as used in the specification and the appended claims refers to and includes any and all possible combinations of one or more of the associated listed items.

As used in the specification and the appended claims of the present application, the term "if" can be interpreted as "when . . . " or "once" or "in response to determining" or "in response to detecting" depending on context. Similarly, a phrase "if it is determined" or "if it is detected [the described condition or event]" can be interpreted as meaning "once it is determined" or "in response to determining" or "once it is detected [the described condition or event]" or "in response to detecting [the described condition or event]" depending on the context.

In addition, in the description of the specification and the appended claims of the present application, the terms "first", "second", "third", etc. are only used to distinguish description and cannot be understood as indicating or implying relative importance.

The reference to "one embodiment" or "some embodiments" etc. described in the specification of the present application means that one or more embodiments of the present application include specific features, structures or characteristics described in conjunction with the embodiment. Therefore, the sentences "in one embodiment", "in some embodiments", "in some other embodiments", "in other embodiments", etc. appearing in different embodiments of the specification do not necessarily refer to the same embodiment, but mean "one or more but not all embodiments", unless otherwise specifically emphasized. The terms "include", "comprises", "has" and their variations all mean "including but not limited to", unless otherwise specifically emphasized.

The control method of the intelligent point of sale provided in an embodiment of the present application can be applied to a terminal device, such as a mobile phone, a tablet computer, a vehicle-mounted device, an augmented reality (AR) device/a virtual reality (VR) device, a laptop computer or an intelligent point of sale. An embodiment of the present application does not impose any restrictions on specific type of terminal devices.

First Embodiment

FIG. 1 shows a schematic flowchart of a method for controlling an intelligent point of sale provided in the present application. As an example, but not a limitation, the method can be applied to a control terminal such as a mobile phone and a tablet computer.

S101, information of an intelligent point of sale from broadcast information is determined in response to the broadcast information being received, which is sent by the intelligent point of sale, the information of the intelligent point of sale includes a SN of the intelligent point of sale and an IP address of the intelligent point of sale.

Specifically, in response to the broadcast information being received, which is sent by the intelligent point of sale via a Bluetooth beacon (the Bluetooth beacon is a lowenergy Bluetooth technology), the information of the intelligent point of sale carried by the above broadcast information is parsed and determined. The information of the intelligent point of sale includes but is not limited to the SN of the intelligent point of sale and the IP address of the intelligent point of sale, where the SN of the intelligent point of sale refers to a unique identifier of the intelligent point of sale.

Specifically, in order to reduce an amount of data transmission, improve data transmission efficiency, and save storage space, the broadcast information sent by the intelligent point of sale is preset as information of the intelligent point of sale compressed by BCD. Correspondingly, in response that a control terminal receives the broadcast information, the broadcast information needs to be decompressed.

In one embodiment, in order to improve security of data transmission, it is preset that the information of the intelligent point of sale compressed by BCD compression needs to be encrypted based on the information of the intelligent point of sale compressed by BCD compression. Correspondingly, in response that the control terminal receives the broadcast information, it needs to decrypt the broadcast information and then decompress the decrypted broadcast information to obtain the information of the intelligent point of sale.

S102, a list of target terminals is determined according to the broadcast information. The list of the target terminals includes information of all the intelligent point of sales and a distance between each intelligent point of sale and the control terminal.

Specifically, based on all the broadcast information received at the current moment, the information of the intelligent point of sale carried by each broadcast information is determined, and the distance between the control terminal and the intelligent point of sale is determined based on an IP address of each information of the intelligent point of sale. The list of the target terminals is generated based on each information of the intelligent point of sale and the distance between each intelligent point of sale and the control terminal, so that the list of the target terminals includes but is not limited to the information of all intelligent point of sales determined by analysis, and the distance between each intelligent point of sale and a current control terminal.

S103, a communication connection relationship with a target intelligent point of sale is established in response to a received communication connection instruction.

Specifically, when receiving a communication connection instruction manually input by a user, sent by a user through an external terminal device, or generated by a screen or a control panel triggered by a user, the target intelligent point of sale of the communication connection instruction is determined, and the communication connection relationship with the target intelligent point of sale is established. Among them, the communication connection instruction is a control instruction for controlling the current control terminal to establish the communication connection relationship with the target intelligent point of sale, which has the SN and the IP address of the target intelligent point of sale.

S104, a communication connection relationship is established between a first intelligent point of sale and a second intelligent point of sale in response to a received intercommunication connection instruction. The first intelligent point of sale and the second intelligent point of sale being two different target intelligent point of sales that are communicatively connected to the control terminal.

Specifically, the first intelligent point of sale and the second intelligent point of sale being two different target intelligent point of sales that are communicatively connected to the control terminal respectively. When the intercommunication connection instruction is received, the information of the intelligent point of sale of the two intelligent point of sales carried in the intercommunication connection instruction is parsed and determined. And based on the above information of the intelligent point of sale, whether the above two intelligent point of sales are both communicatively connected with the control terminal is determined. In response that the first intelligent point of sale and the second intelligent point of sale are two different target intelligent point of sales that are communicatively connected to the control terminal respectively, the communication connection relationship is established between the first intelligent point of sale and the second intelligent point of sale.

In one embodiment, the communication connection relationship with the target intelligent point of sale is established in response to the received communication connection instruction includes:

- the communication connection instruction is parsed to obtain information of the target intelligent point of sale for the target intelligent point of sale, which is carried by the communication connection instruction in response to the received intercommunication connection instruction.
- the communication connection relationship with the target intelligent point of sale is established in response that the target intelligent point of sale of the list of the target terminals is matched according to the information of the target intelligent point of sale;
- a connection status with the target intelligent point of sale is updated to be connected. The connection status includes a connected status, a connection failure status and a disconnected status.

Specifically, in response that the communication connection instruction is received, the communication connection instruction is parsed to obtain the target intelligent point of sale (specifically the SN and IP address of the target intelligent point of sale) carried by the communication connection instruction. In response that the corresponding intelligent point of sale is matched in the list of the target terminals based on the SN and IP address of the target intelligent point of sale, a device connection instruction is generated according to the communication connection instruction and sent to the target intelligent point of sale to establish the communication connection relationship with the target intelligent point of sale, and the connection status between the current control terminal and the target intelligent point of sale is updated to be connected. The connection status includes but is not limited to a connected status, a connection failure status and a disconnected status.

In one embodiment, in response that the communication connection relationship with the target intelligent point of sale is not successfully established, the connection status with the target intelligent point of sale is updated to be the connection failure status, and an alarm message of the connection failure is generated and displayed on a display device.

Specifically, in response that the communication connection relationship with the target intelligent point of sale is not successfully established, it is determined that the current control terminal, the target intelligent point of sale or the network status may be failure, and the connection status with the target intelligent point of sale is updated to be the connection failure status, and an alarm message of the connection failure is generated and displayed on the display device to remind the user to perform security checks on the device and the network.

In one embodiment, after updating the connection status with the target intelligent point of sale to be the connected status, the method further includes:

an instruction for searching device information is sent to the target intelligent point of sale, and the device information returned by the target intelligent point of sale is received and stored in the list of the target terminals.

Specifically, the instruction for searching the device information is manually input by the user, sent by the user through an external terminal device, or generated by the screen or the control panel that is triggered by the user. It is specifically used to control the target smart terminal device to return the device information of the device (including but not limited to a version of a system and a device model, etc.), send the received instruction to the target intelligent point of sale, and receive the device information returned by the target intelligent point of sale, and store the device information in the list of the target terminals, so as to determine the device information of each intelligent point of sale that is communicated with the control terminal. The device information and the target intelligent point of sale are mapped one to one in the list of the target terminals.

In one embodiment, the communication connection relationship is established between the first intelligent point of sale and the second intelligent point of sale in response to the received intercommunication connection instruction includes:

the intercommunication connection instruction is parsed to determine the first intelligent point of sale and the second intelligent point of sale according to the intercommunication connection instruction in response to the received intercommunication connection instruction;

a first connection status between the control terminal and the first intelligent point of sale is determined, and a second connection status between the control terminal and the second intelligent point of sale is determined respectively;

a device interconnection instruction is sent to the first intelligent point of sale and the second intelligent point of sale to control the first intelligent point of sale and the second intelligent point of sale to establish a communication connection relationship in response that the first connection status and the second connection status are both connected;

device interconnection results returned by the first intelligent point of sale and the second intelligent point of sale are received respectively.

Specifically, when receiving the intercommunication connection instruction manually input by the user, sent by the user through the external terminal device, or generated by the screen or the control panel that is triggered by the user, the intercommunication connection instruction is parsed to determine the first intelligent point of sale and the second intelligent point of sale (specifically, first intelligent point of sale information of the first intelligent point of sale and second intelligent point of sale information of the second intelligent point of sale) carried by the intercommunication connection instruction. And the first connection status between the current control terminal and the first intelligent point of sale and the second connection status between the current control terminal and the second intelligent point of sale are determined according to the first intelligent point of sale information and the second intelligent point of sale information, respectively. When it is detected that the first connection status and the second connection status are both the connected status, the device interconnection instruction is sent to the first intelligent point of sale and the second intelligent point of sale to control the first intelligent point of sale and the second intelligent point of sale to establish the communication connection relationship, and the device interconnection results returned by the first intelligent point of sale and the second intelligent point of sale are received respectively. Among them, the intercommunication connection instruction is a control instruction to establish a communication connection relationship between the first intelligent point of sale and the second intelligent point of sale based on the current control terminal, and the device interconnection instruction is an instruction to control the first intelligent point of sale and the second intelligent point of sale to establish a communication connection relationship. The device interconnection results include interconnection success and interconnection failure.

In one embodiment, when it is detected that either the first connection state or the second connection state is not connected, interconnection failure information is generated and displayed on a display screen/display device in response that either the first connection status or the second connection status is not connected.

In one embodiment, when any device interconnection result is detected as interconnection failure, interconnection failure information is generated and displayed on a display screen/display device.

In one embodiment, after the communication connection relationship with the target intelligent point of sale is established in response to receiving the communication connection instruction, the method further includes:

A terminal control instruction is sent to the target intelligent point of sale to control the target intelligent point of sale to perform a corresponding operation in response to receiving the terminal control instruction, the terminal control instruction includes a type of operation, time of operation, and number of times for operation.

the operation result returned by the target intelligent point of sale is received.

Specifically, after establishing the communication connection with the target intelligent point of sale, upon receiving a terminal control instruction manually input by the user, sent by the user through an external terminal device, or generated by the screen or the control panel that is triggered by the user. The type of the operation, the time of the operation, and the number of times for the operation carried by the terminal control instruction are determined. The terminal control instruction is controlled and sent to the target intelligent point of sale to control the target intelligent point of sale to perform the corresponding operation, and the operation result returned by the target intelligent point of sale is received. The terminal control instruction includes but is not limited to a type of operation, time of operation, and number of times for operation.

For example, the type of the operation of the terminal control instruction includes sending device information, the time of the operation is 10:00, and the number of times for the operation is equal to 1. When the corresponding target intelligent point of sale receives the terminal control instruction, it needs to send the device information of the target intelligent point of sale to the target intelligent point of sale once at 10:00. Alternatively, the terminal control instruction is used to control the target intelligent point of sale to perform various operations such as transferring files, printing information, shutting down, and restarting.

The embodiment determines the list of all manageable intelligent point of sales through the broadcast information of the intelligent point of sale, establishes the communication connection relationship with the target intelligent point of sale, and establishes the communication connection relationship between multiple intelligent point of sales when receiving the intercommunication instruction, thereby realizing communication between multiple devices, flexibly managing multiple intelligent point of sales, and improving the management efficiency of intelligent point of sales.

Second Embodiment

Figure 2:
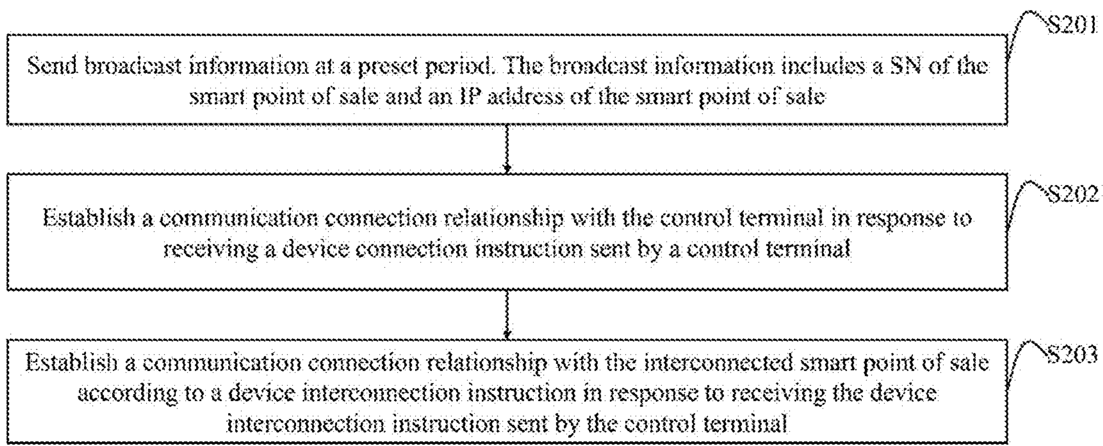
FIG. 2 is a schematic diagram of another flowchart of a method for controlling an intelligent point of sale provided by a second embodiment of the present application.

FIG. 2 shows another schematic flowchart of a method for controlling an intelligent point of sale provided in the present application. As an example, but not a limitation, the method can be applied to the intelligent point of sale, including:

S201, broadcast information is sent at a preset period. The broadcast information includes a SN of the intelligent point of sale and an IP address of the intelligent point of sale.

Specifically, the broadcast information is sent to a surrounding environment at the preset period by a Bluetooth Beacon, and the broadcast information has the information of an intelligent point of sale of the current intelligent point of sale, and the information of an intelligent point of sale includes but is not limited to the SN of the current intelligent point of sale and the IP address of the current intelligent point of sale. The preset period can be set according to an actual situation, for example, the preset period is set to 30 s.

Specifically, in order to reduce the amount of data transmission, improve data transmission efficiency, and save storage space, the broadcast information sent by the intelligent point of sale is preset as information of an intelligent point of sale compressed by BCD.

In one embodiment, in order to improve the security of data transmission, it is preset that the information of an intelligent point of sale compressed by BCD compression needs to be encrypted based on the information of an intelligent point of sale compressed by BCD compression.

It can be understood that, for the contents in this embodiment that are the same or similar to those in the first embodiment, reference can be made to the specific description in the first embodiment, and no further details will be given here.

S202, a communication connection relationship with the control terminal is established in response to a received device connection instruction sent by a control terminal.

Specifically, when receiving the device connection instruction sent by the control terminal, a communication port of the control terminal is determined based on the device connection instruction, and the communication connection relationship with the control terminal is established based on the communication port. For example, a preset communication port is 5555, and the communication connection relationship with the control terminal can be established through the preset communication port.

S203, a communication connection relationship with the interconnected intelligent point of sale is established according to a device interconnection instruction in response to the device interconnection instruction being received, which is sent by the control terminal.

Specifically, when the device interconnection instruction sent by the control terminal is received, the interconnected intelligent point of sale of the device interconnection instruction is determined, and the communication connection relationship with the interconnected intelligent point of sale is established based on the above device interconnection instruction.

In one embodiment, the communication connection relationship with the interconnected intelligent point of sale is established according to the device interconnection instruction in response to the device interconnection instruction being received, which is sent by the control terminal includes:

- the device interconnection instruction is parsed to obtain information of an interconnected intelligent point of sale carried by the device interconnection instruction in response to the device interconnection instruction being received, which is sent by the control terminal. The information of the interconnected intelligent point of sale includes the SN of the interconnected intelligent point of sale and the IP address of the interconnected intelligent point of sale.
- the communication connection relationship with the interconnected intelligent point of sale is established according to the information of the interconnected intelligent point of sale.

Specifically, when receiving the device interconnection instruction sent by the control terminal, the device interconnection instruction is parsed to obtain the information of the interconnected intelligent point of sale carried by the device interconnection instruction. The information of the interconnected intelligent point of sale includes the SN of the interconnected intelligent point of sale and the IP address of the interconnected intelligent point of sale. The communication connection relationship with the interconnected intelligent point of sale is established according to the information of the interconnected intelligent point of sale, and the interconnection result is returned to the control terminal. The interconnection result includes interconnection success and interconnection failure.

It can be understood that the current intelligent point of sale and the interconnected intelligent point of sale being two different intelligent point of sales that are respectively communicatively connected to the control terminal.

In one embodiment, when the instruction for searching device information sent by the control terminal is received, the device information is sent to the control terminal.

In one embodiment, the method further comprises:

When receiving a terminal control instruction sent by the control terminal, the terminal control instruction is parsed to obtain a type of operation, time of operation, and number of times for operation carried by the control instruction.

A corresponding operation is performed according to the control instruction and a result of the corresponding operation is returned to the intelligent point of sale.

Specifically, when receiving the terminal control instruction sent by the control terminal, the terminal control instruction is parsed to obtain the type of the operation, the time of the operation, and the number of times for the operation carried by the control instruction, the corresponding operation corresponding to the control instruction is performed, and the result of the corresponding operation is returned to the intelligent point of sale.

This embodiment is discovered by the control terminal through broadcast information, the communication connection relationship with the control terminal is established based on the device connection, and the communication connection relationship with the intercommunication intelligent point of sale is established when receiving the intercommunication instruction, thereby realizing communication between multiple devices, so that the control terminal can flexibly manage multiple intelligent point of sales, thereby improving the management efficiency of the intelligent point of sales.

It should be understood that magnitudes of a serial numbers of the steps in the above embodiments does not mean an order of execution. The execution order of each process should be determined by its function and internal logic and should not constitute any limitation on an implementation process of the embodiments of the present application.

Third Embodiment

Figure 3:
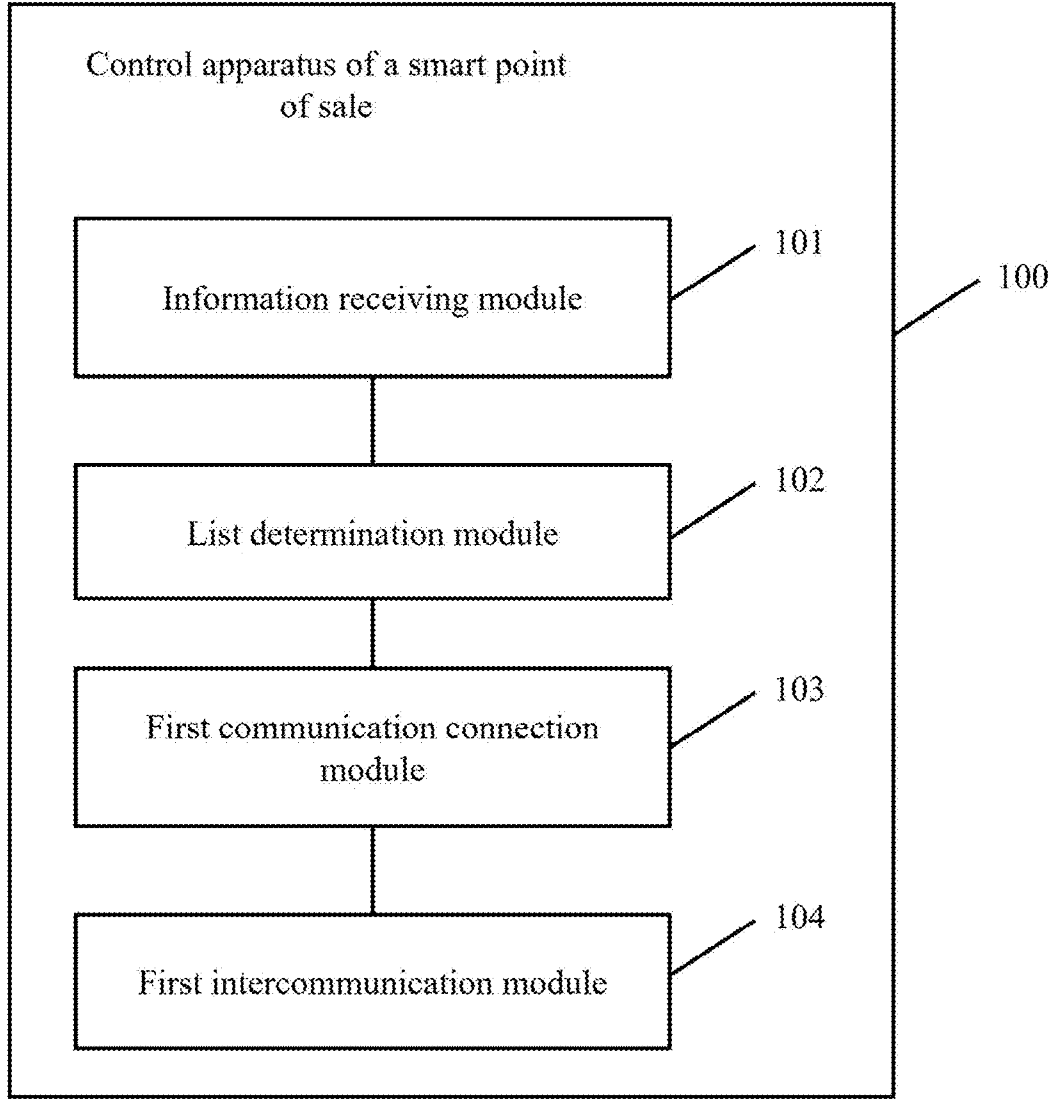
FIG. 3 is a schematic diagram of a structural of a control apparatus for an intelligent point of sale provided by a third embodiment of the present application.

Corresponding to the control method of the intelligent point of sale described in the first embodiment above, FIG. 3 shows a block diagram of a control apparatus of the intelligent point of sale provided in the embodiment of the present application, and the control apparatus of the intelligent point of sale is applied to the control terminal. For ease of explanation, only the part related to the embodiment of the present application is shown.

Referring to FIG. 3, the control apparatus 100 of the intelligent point of sale includes:

An information receiving module 101 is used to determine information of an intelligent point of sale from broadcast information in response to the broadcast information being received, which is sent by the intelligent point of sale, the information of the intelligent point of sale includes a SN of the intelligent point of sale and an IP address of the intelligent point of sale.

A list determination module 102 is used to determine a list of target terminals is determined according to the broadcast information. The list of the target terminals includes information of an intelligent point of sale of all the intelligent point of sales and a distance between each intelligent point of sale and the control terminal.

A first communication connection module 103 is used to establish the communication connection relationship with the target intelligent point of sale in response to the received communication connection instruction.

A first intercommunication module 104 is used to establish the communication connection relationship between the first intelligent point of sale and the second intelligent point of sale in response to the received intercommunication connection instruction. The first intelligent point of sale and the second intelligent point of sale being two different target intelligent point of sales that are communicatively connected to the control terminal.

In one embodiment, the first communication connection module includes:

A first parsing unit is used to parse the communication connection instruction in response to the received communication connection instruction, and obtain the information of the target intelligent point of sale for the target intelligent point of sale, which is carried by the communication connection instruction.

A matching unit is used to establish the communication connection relationship with the target intelligent point of sale in response that the target intelligent point of sale of the list of the target terminals is matched according to the information of the target intelligent point of sale.

An updating unit is used to update the connection status with the target intelligent sales terminal to be connected. The connection status includes the connected status, the connection failure status and the disconnected status.

In one embodiment, the first intercommunication module includes:

A second parsing unit is configured to parse the intercommunication connection instruction in response to the received intercommunication connection instruction and determine the first intelligent point of sale and the second intelligent point of sale according to the intercommunication connection instruction.

A status determination unit is used to determine the first connection status between the control terminal and the first intelligent point of sale, and the second connection status between the control terminal and the second intelligent point of sale respectively.

A sending unit is used to send the device interconnection instruction to the first intelligent point of sale and the second intelligent point of sale to control the first intelligent point of sale and the second intelligent point of sale to establish the communication connection relationship in response that the first connection status and the second connection status are both the connected status.

A receiving module is used to receive the device interconnection results that are returned by the first intelligent point of sale and the second intelligent point of sale, respectively.

In one embodiment, the device further comprises:

A control module, configured to send the terminal control instruction to the target intelligent point of sale upon receiving the terminal control instruction, so as to control the target intelligent point of sale to perform a corresponding operation; the terminal control instruction includes an operation type, an operation time and an operation number;

The receiving module is used to receive the operation result returned by the target intelligent sales terminal.

This embodiment determines the list of all manageable intelligent point of sales through the broadcast information of the intelligent point of sale, establishes the communication connection relationship with the target intelligent point of sale, and establishes the communication connection relationship between multiple intelligent point of sales when receiving an intercommunication instruction, thereby realizing communication between multiple devices, flexibly managing multiple intelligent point of sales, and improving the management efficiency of intelligent point of sales.

Fourth Embodiment

Figure 4:
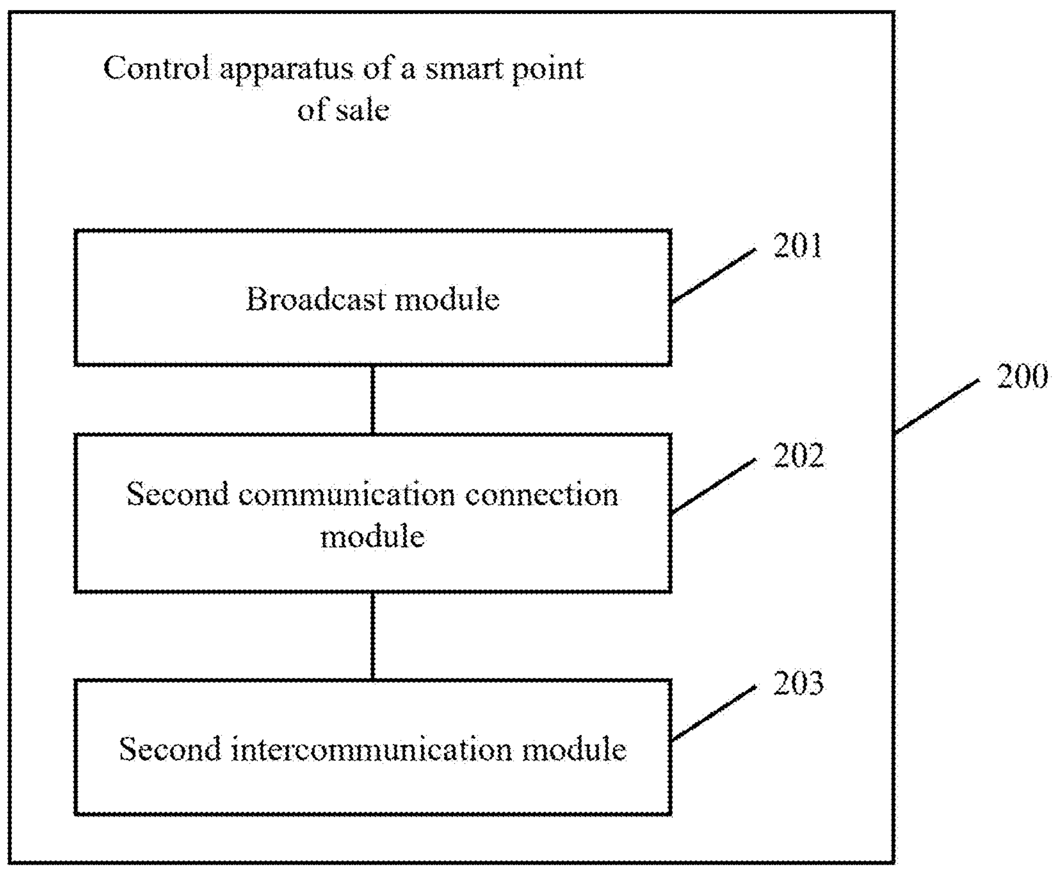
FIG. 4 is a schematic diagram of another structural of a control apparatus for an intelligent point of sale provided by a fourth embodiment of the present application.

Corresponding to the control method of the intelligent point of sale described in the above second embodiment, FIG. 4 shows a block diagram of a control apparatus of the intelligent point of sale provided in the embodiment of the present application, and the control apparatus of the intelligent point of sale is applied to the intelligent point of sale. For ease of explanation, only the part related to the embodiment of the present application is shown.

Referring to FIG. 4, the control apparatus 200 of the intelligent point of sale includes:

A broadcast module 201 is used to send broadcast information at the preset period. The broadcast information includes the SN of the intelligent point of sale and the IP address of the intelligent point of sale.

A second communication connection module 202 is used to establish the communication connection relationship with the control terminal in response to the received device connection instruction sent by the control terminal.

A second intercommunication module 203 is used to establish the communication connection relationship with the interconnected intelligent point of sale according to the device interconnection instruction in response to the device interconnection instruction being received, which is sent by the control terminal.

In one embodiment, the second intercommunication module includes:

A third parsing unit is used to parse the device interconnection instruction sent by the control terminal in response to the device interconnection instruction and obtain the interconnection information of the intelligent point of sale of the interconnected intelligent point of sale carried by the device interconnection instruction. The interconnection information of an intelligent point of sale includes the SN of the interconnected intelligent point of sale and the IP address of the interconnected intelligent point of sale.

An establishing unit is used to establish the communication connection relationship with the interconnected intelligent sales terminal according to the interconnected information of the intelligent point of sale.

In one embodiment, the device further comprises:

The parsing module is used to parse the terminal control instruction in response to the terminal control instruction sent by the control terminal, and obtain the type of the operation, the time of the operation, and the number of times for operation carried by the control instruction.

The sending module is used to perform the corresponding operation according to the control instruction and return the result of the corresponding operation to the intelligent point of sale.

This embodiment is discovered by the control terminal through broadcast information, the communication connection relationship with the control terminal is established based on the device connection, and the communication connection relationship with the intercommunication intelligent point of sale is established when receiving the intercommunication instruction, thereby realizing communication between multiple devices, so that the control terminal can flexibly manage multiple intelligent point of sales, thereby improving the management efficiency of the intelligent point of sales.

It should be noted that the information interaction, execution process, etc. between the above-mentioned devices units are based on the same concept as the method embodiment of the present application. Their specific functions and technical effects can be found in the method embodiment part and will not be repeated here.

Fifth Embodiment

Figure 5:
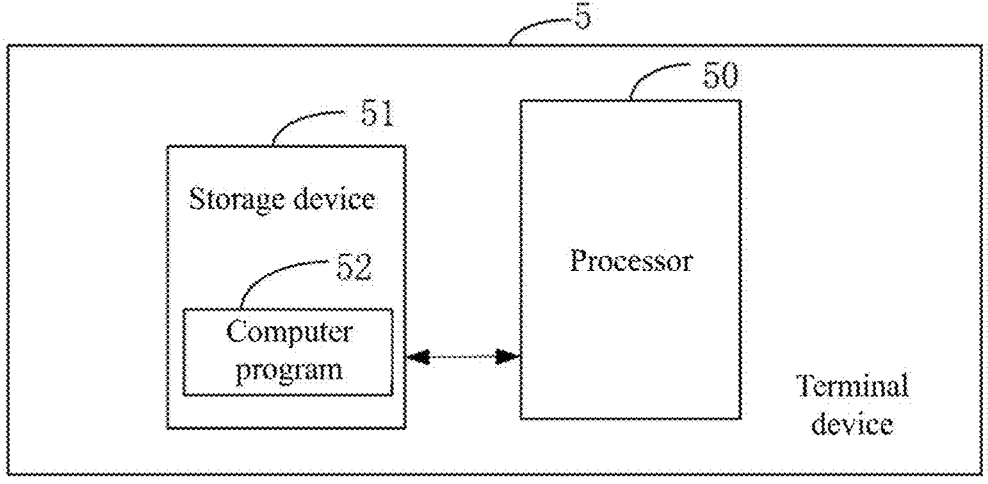
FIG. 5 is a schematic diagram of a structural of a terminal device provided by an embodiment of the present application.

FIG. 5 is a schematic diagram of the structure of the terminal device provided in this embodiment. As shown in FIG. 5, the terminal device 5 of this embodiment includes, at least one processor 50 (only one is shown in FIG. 5), a storage device 51, and a computer program 52 stored in the storage device 51 and executable on the at least one processor 50, and when the processor 50 executes the computer program 52, the steps in any of the above-mentioned control method embodiments of the intelligent sales terminal are implemented.

The terminal device 5 may be a computing device such as a desktop computer, a notebook, a PDA, a cloud server, etc. The terminal device may include, but is not limited to, a processor 50 and a storage device 51. Those skilled in the art will appreciate that FIG. 5 is merely an example of the terminal device 5 and does not constitute a limitation on the terminal device 5. The terminal device 5 may include more or fewer components than shown in the drawings, or may combine certain components, or different components, and may also include, for example, an input and output device, a network access device, etc.

The processor 50 may be a central processing unit (CPU), or other general-purpose processors, a digital signal processor (DSP), an application-specific integrated circuit (ASIC), a field-programmable gate array (FPGA) or other programmable logic devices, a discrete gate or transistor logic device, a discrete hardware component, etc. A general-purpose processor may be a microprocessor or any conventional processor, etc.

In some embodiments, the storage device 51 may be an internal storage unit of the terminal device 5, such as a hard disk or memory of the terminal device 5. In other embodiments, the storage device 51 may also be an external storage device of the terminal device 5, such as a plug-in hard disk, a smart media card (SMC), a secure digital card (SD), a flash card, etc. equipped on the terminal device 5. Further, the storage device 51 may also include both an internal storage unit and an external storage device of the terminal device 5. The storage device 51 is used to store an operating system, an application program, a boot loader (BootLoader), data, and other programs, such as the program code of the computer program, etc. The storage device 51 may also be used to temporarily store data that has been output or is to be output.

The technicians in the relevant field can clearly understand that for the convenience and simplicity of description, only the division of the above-mentioned functional units and modules is used as an example for illustration. In practical applications, the above-mentioned function allocation can be completed by different functional units and modules as needed, that is, the internal structure of the device can be divided into different functional units or modules to complete all or part of the functions described above. The functional units and modules in the embodiment can be integrated in a processing unit, or each unit can exist physically separately, or two or more units can be integrated in one unit. The above-mentioned integrated unit can be implemented in the form of hardware or in the form of software functional units. In addition, the specific names of the functional units and modules are only for the convenience of distinguishing each other, and are not used to limit the scope of protection of this application. The specific working process of the units and modules in the above-mentioned system can refer to the corresponding process in the aforementioned method embodiment, which will not be repeated here.

An embodiment of the present application further provides a computer-readable storage medium, the computer-readable storage medium stores a computer program, and when the computer program is executed by a processor, the steps in the above-mentioned method embodiments can be implemented.

An embodiment of the present application provides a computer program product. When the computer program product runs on a mobile terminal, the mobile terminal can implement the steps in the above-mentioned method embodiments when executing the computer program product.

If the integrated unit is implemented in the form of a software functional unit and sold or used as an independent product, it can be stored in a computer-readable storage medium. Based on this understanding, the present application implements all or part of the processes in the above-mentioned embodiment method, which can be completed by instructing the relevant hardware through a computer program. The computer program can be stored in a computer-readable storage medium. When the computer program is executed by the processor, the steps of the above-mentioned method embodiments can be implemented. Among them, the computer program includes computer program code, and the computer program code can be in source code form, object code form, executable file or some intermediate form. The computer-readable medium can at least include: any entity or device that can carry the computer program code to the camera/terminal device, recording medium, computer memory, read-only memory (ROM), random access memory (RAM), electric carrier signal, telecommunication signal and software distribution medium. For example, a USB flash drive, a mobile hard disk, a magnetic disk or an optical disk. In some jurisdictions, according to legislation and patent practice, computer-readable media cannot be electric carrier signals and telecommunication signals.

In the above embodiments, the description of each embodiment has its own emphasis. For parts that are not described or recorded in detail in a certain embodiment, reference can be made to the relevant descriptions of other embodiments.

Those of ordinary skill in the art will appreciate that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Professional and technical personnel can use different methods to implement the described functions for each specific application, but such implementation should not be considered to be beyond the scope of this application.

In the embodiments provided in the present application, it should be understood that the disclosed devices/network equipment and methods can be implemented in other ways. For example, the device/network equipment embodiments described above are merely schematic. For example, the division of the modules or units is only a logical function division. There may be other division methods in actual implementation, such as multiple units or components can be combined or integrated into another system, or some features can be ignored or not executed. Another point is that the mutual coupling or direct coupling or communication connection shown or discussed can be through some interfaces, indirect coupling or communication connection of devices or units, which can be electrical, mechanical or other forms.

The units described as separate components may or may not be physically separated, and the components shown as units may or may not be physical units, that is, they may be located in one place or distributed on multiple network units. Some or all of the units may be selected according to actual needs to achieve the purpose of the solution of this embodiment.

The embodiments described above are only used to illustrate the technical solutions of the present application, rather than to limit them. Although the present application has been described in detail with reference to the aforementioned embodiments, a person skilled in the art should understand that the technical solutions described in the aforementioned embodiments may still be modified, or some of the technical features may be replaced by equivalents. Such modifications or replacements do not deviate the essence of the corresponding technical solutions from the spirit and scope of the technical solutions of the embodiments of the present application, and should all be included in the protection scope of the present application

The invention claimed is:

1. A method for controlling an intelligent point of sale, applied to a control terminal, the method comprising:

determining information of the intelligent point of sale from broadcast information in response to the broadcast information being received, which is sent by the intelligent point of sale, the information of the intelligent point of sale comprising a serial number of the intelligent point of sale and an internet protocol address of the intelligent point of sale;

determining a list of target terminals according to the broadcast information, the list of the target terminals comprising information of all the intelligent point of sales and a distance between each intelligent point of sale and the control terminal;

establishing a communication connection relationship with a target intelligent point of sale in response to a received communication connection instruction;

sending a terminal control instruction to the target intelligent point of sale and controlling the target intelligent point of sale, and performing a corresponding operation in response to the terminal control instruction, wherein the terminal control instruction comprises a type of an operation, time of the operation, and a number of times for the operation;

receiving the operation result returned by the target intelligent point of sale; and establishing a communication connection relationship between a first intelligent point of sale and a second intelligent point of sale in response to a received intercommunication connection instruction, and the first intelligent point of sale and the second intelligent point of sale being two different target intelligent point of sales that are communicatively connected to the control terminal.

2. The method according to claim 1, wherein establishing the communication connection relationship with the target intelligent point of sale in response to the received communication connection instruction comprises:

parsing the received communication connection instruction in response to the received communication connection instruction and obtaining information of the target intelligent point of sale for the target intelligent point of sale, which is carried by the received communication connection instruction;

establishing the communication connection relationship with the target intelligent point of sale in response that the target intelligent point of sale of the list of the target terminals is matched according to the information of the target intelligent point of sale; and updating a connection status with the target intelligent point of sale to be connected, wherein the connection status comprises a connected status, a connection failure status and a disconnected status.

3. The method according to claim 1, wherein establishing the communication connection relationship between the first intelligent point of sale and the second intelligent point of sale in response to the received intercommunication connection instruction comprises:

parsing the received intercommunication connection instruction in response to the received intercommunication connection instruction and determining the first intelligent point of sale and the second intelligent point of sale according to the received intercommunication connection instruction;

determining a first connection status between the control terminal and the first intelligent point of sale, and a second connection status between the control terminal and the second intelligent point of sale respectively;

sending a device interconnection instruction to the first intelligent point of sale and the second intelligent point of sale and controlling the first intelligent point of sale and the second intelligent point of sale to establish the communication connection relationship in response that the first connection status and the second connection status are both connected;

receiving device interconnection results returned by the first intelligent point of sale and the second intelligent point of sale respectively.

4. A method for controlling an intelligent point of sale, applied to the intelligent point of sale, the method comprising:

sending broadcast information at a preset period, the broadcast information comprising a serial number of the intelligent point of sale and an internet protocol address of the intelligent point of sale;

establishing a communication connection relationship with the control terminal in response to a received device connection instruction sent by a control terminal;

establishing a communication connection relationship with an interconnected intelligent point of sale according to a device interconnection instruction in response to the device interconnection instruction being received, which is sent by the control terminal;

parsing the terminal control instruction in response to a terminal control instruction being received, which is sent by the control terminal, and obtaining a type of an operation, time of the operation, and a number of times for the operation carried by the terminal control instruction;

performing a corresponding operation according to the terminal control instruction and returning a result of the corresponding operation to the intelligent point of sale.

5. The method according to claim 4, wherein establishing the communication connection relationship with the interconnected intelligent point of sale according to the device interconnection instruction in response to the device interconnection instruction being received, which is sent by the control terminal comprises:

parsing the device interconnection instruction in response to the device interconnection instruction being received, which is sent by the control terminal and obtaining information of the interconnected intelligent point of sale carried by the device interconnection instruction, wherein the information of the interconnected intelligent point of sale comprises the serial number of the interconnected intelligent point of sale and the internet protocol address of the interconnected intelligent point of sale;

establishing the communication connection relationship with the interconnected intelligent point of sale according to the information of the interconnected intelligent point of sale.

6. A terminal device comprises a storage device, a processor, and a computer program stored in the storage device and executable on the processor, the processor is caused to:

determine information of the intelligent point of sale from broadcast information in response to the broadcast information being received, which is sent by the intelligent point of sale, the information of the intelligent point of sale comprising a serial number of the intelligent point of sale and an internet protocol address of the intelligent point of sale;

determine a list of target terminals according to all the broadcast information, the list of the target terminals comprising information of all the intelligent point of sales and a distance between each intelligent point of sale and the control terminal;

establish a communication connection relationship with a target intelligent point of sale in response to a received communication connection instruction;

send a terminal control instruction to the target intelligent point of sale and control the target intelligent point of sale, and perform a corresponding operation in response to the terminal control instruction, wherein the terminal control instruction comprises a type of an operation, time of the operation, and a number of times for the operation;

receive the operation result returned by the target intelligent point of sale; and establish a communication connection relationship between a first intelligent point of sale and a second intelligent point of sale in response to a received intercommunication connection instruction, and the first intelligent point of sale and the second intelligent point of sale being two different target intelligent point of sales that are communicatively connected to the control terminal.

7. The terminal device according to claim 6, wherein the processor establishes the communication connection relationship with the target intelligent point of sale in response to the received communication connection instruction by:

parsing the received communication connection instruction in response to the received communication connection instruction and obtaining information of the target intelligent point of sale for the target intelligent point of sale, which is carried by the received communication connection instruction;

establishing the communication connection relationship with the target intelligent point of sale in response that the target intelligent point of sale of the list of the target terminals is matched according to the information of the target intelligent point of sale; and updating a connection status with the target intelligent point of sale to be connected, wherein the connection status comprises a connected status, a connection failure status and a connected status.

8. The terminal device according to claim 6, wherein the processor establishes the communication connection relationship between the first intelligent point of sale and the second intelligent point of sale in response to the received intercommunication connection instruction by:

parsing the received intercommunication connection instruction in response to the received intercommunication connection instruction and determining the first intelligent point of sale and the second intelligent point of sale according to the received intercommunication connection instruction;

determining a first connection status between the control terminal and the first intelligent point of sale, and a second connection status between the control terminal and the second intelligent point of sale respectively;

sending a device interconnection instruction to the first intelligent point of sale and the second intelligent point of sale and controlling the first intelligent point of sale and the second intelligent point of sale to establish the communication connection relationship in response that the first connection status and the second connection status are both connected;

receiving device interconnection results returned by the first intelligent point of sale and the second intelligent point of sale respectively.

9. The terminal device according to claim 6, wherein the processor is further caused to:

send broadcast information at a preset period, the broadcast information comprising a serial number of the intelligent point of sale and an internet protocol address of the intelligent point of sale;

establish a communication connection relationship with the control terminal in response to a received device connection instruction sent by a control terminal;

establish a communication connection relationship with an interconnected intelligent point of sale according to a device interconnection instruction in response to the device interconnection instruction being received, which is sent by the control terminal.

10. The terminal device according to claim 9, wherein the processor establishes the communication connection relationship with the interconnected intelligent point of sale according to the device interconnection instruction in response to the device interconnection instruction being received, which is sent by the control terminal by:

parsing the device interconnection instruction in response to the device interconnection instruction being received, which is sent by the control terminal and obtaining information of the interconnected intelligent point of sale carried by the device interconnection instruction, wherein the information of the interconnected intelligent point of sale comprises the serial number of the interconnected intelligent point of sale and the internet protocol address of the interconnected intelligent point of sale;

establishing the communication connection relationship with the interconnected intelligent point of sale according to the information of the interconnected intelligent point of sale.

11. The terminal device according to claim 9, wherein the processor is further caused to:

parse the terminal control instruction in response to a terminal control instruction being received, which is sent by the control terminal, and obtain a type of an operation, time of the operation, and a number of times for the operation carried by the terminal control instruction;

perform a corresponding operation according to the terminal control instruction and return a result of the corresponding operation to the intelligent point of sale.

* * * * *